United States Patent [19]

Roley

[11] 4,140,015
[45] Feb. 20, 1979

[54] BEARING JOINT AND METHOD OF MEASURING THE FLUID LEVEL THEREIN

[75] Inventor: Robert D. Roley, Peoria, Ill.

[73] Assignee: Caterpillar Tractor Co., Peoria, Ill.

[21] Appl. No.: 909,751

[22] Filed: May 26, 1978

[51] Int. Cl.² ............................................. G01F 23/10
[52] U.S. Cl. .................................. 73/304 R; 340/59; 340/620; 340/682
[58] Field of Search ................. 73/304 R; 116/118 R, 116/109; 340/59, 682, 620, 631; 180/9.2 R

[56] References Cited

U.S. PATENT DOCUMENTS

| 2,889,545 | 6/1959 | Allegrina | 73/304 R |
| 3,518,962 | 7/1970 | De Leu et al. | 116/118 R |

*Primary Examiner*—Anthony V. Ciarlante
*Attorney, Agent, or Firm*—Charles E. Lanchantin, Jr.

[57] ABSTRACT

A bearing joint has a body defining an internal chamber, an opening for supplying an electrically conducting fluid to the chamber, and an electrically nonconducting plug in the opening. An electrical conductor extends through the plug so that the electrical resistance can be measured through the fluid between the conductor and the body of the bearing joint.

6 Claims, 4 Drawing Figures

BEARING JOINT AND METHOD OF MEASURING THE FLUID LEVEL THEREIN

BACKGROUND OF THE INVENTION

This invention relates to a bearing joint, and more particularly to a bearing joint in which the electrical resistance therethrough is a measure of the presence of a fluid therein.

Frequently there is a need for determining the level of a lubricating fluid, such as oil, in a bearing joint. For example, the pivotal joints of an endless track chain, such as those used on earthmoving crawler tractors, usually contain a lubricating fluid. But after an extended period of operation a portion of the lubricating fluid sometimes undesirably escapes past the seals of these bearing joints. Accordingly, it has been the practice to check the lubricant level by releasing an end plug in each joint. This not only requires considerable disassembly time and downtime of the vehicle on which the joints are located, but also is messy when the lubricant runs out. Moreover, opening of the joints in the field, for example, can result in deleterious material such as dirt getting into the joints upon replacement of the end plugs.

In view of the above, it would be advantageous to provide a fluid level indicating device that can quickly determine the presence of the desired amount of lubricant within such bearing joints without opening them up and exposing the internal portions of the joint to the entry of foreign contaminants.

SUMMARY OF THE INVENTION

The present invention is directed to overcoming one or more of the problems as set forth above.

According to the present invention, this is accomplished by providing a bearing joint having a body with a chamber therein, an opening for supplying an electrically conducting fluid to the chamber, an electrically nonconducting plug in the opening, and an electrical conductor having an axis offset from the axis of the plug so that the electrical resistance can be measured between the conductor and the body of the bearing joint through the fluid at different elevational attitudes of the conductor relative to the axis of the plug.

DETAILED DESCRIPTION

Figure 1:
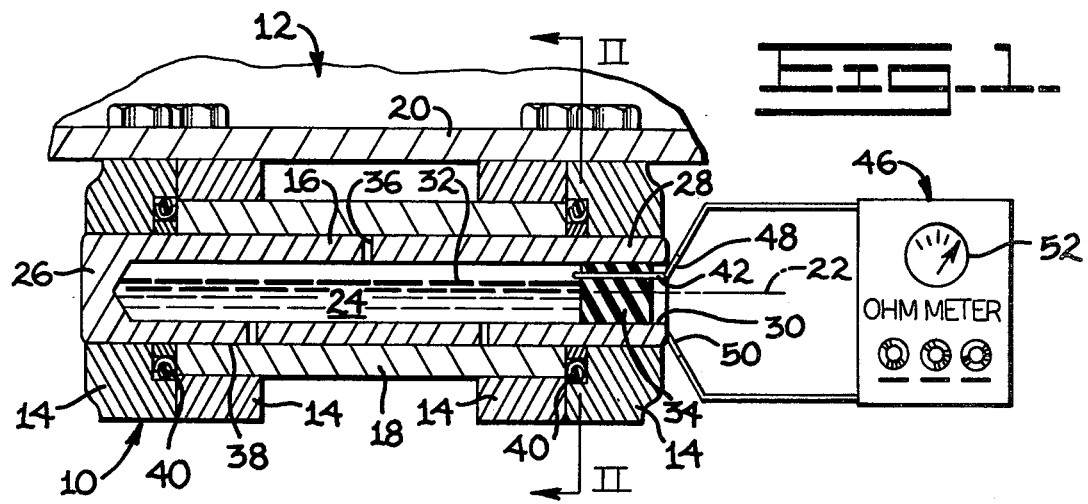
FIG. 1 is a fragmentary, diagrammatic, sectional view taken vertically through the central axis of a bearing joint constructed in accordance with the present invention.

In the illustrated embodiment of this invention, the bearing joint 10 finds particular utility in the environment of a track chain 12 having a plurality of laterally spaced apart pairs of parallel track links 14. Each pair of the track links are pivotally interconnected by a hollow track pin 16 and a complimentary coaxially disposed and encircling bushing 18 to an adjacent and cooperating pair of track links in such a way that an articulated, endless loop of the track chain is formed. A plurality of ground-engaging track shoes 20 are each connected to one of the respective pairs of the track links, and the track chain is trained over a drive sprocket and an idler sprocket disposed at the opposite ends of the loop, not shown, to afford motivating and steering for a crawler-type vehicle in a well known manner.

More particularly, the track pin 16 of each one of the bearing joints 10 has a central axis 22 that is located in use substantially in a horizontal plane, and the body of the pin forms an internal chamber 24 symmetrically located along the central axis. Thus, the pin has a closed end 26 and an open end 28 having a cylindrical opening 30 for supplying a lubricating fluid 32 to the chamber. An electrically nonconducting plug 34 of elastomeric material or the like is releasably secured in the opening to retain the lubricating fluid within the bearing joint, and the fluid is distributed from the chamber through a plurality of radial passages 36 to the coacting, internally disposed surfaces 38 of the pin and bushing. This extends substantially the service life of the track chain, and reduces the noise level and energy required during its operation. A pair of seal assemblies 40 located at the opposite ends of the bushing serve to minimize loss of the lubricating fluid and to prevent the entry of foreign matter into the joints.

In accordance with a major aspect of the invention an electrical conductor 42 extends through the plug 34 and into communication with the chamber 24 within the track pin 16. Advantageously, the conductor 42 is arranged on an axis 44 parallel to and offset a preselected radial distance D from the central axis 22 as shown in FIG. 2, and extends axially outwardly beyond both the inner and outer end surfaces of the plug as shown in FIG. 1.

The lubricating fluid 32 within the bearing joint 10 is preferably oil having an electrically conductive material suspended therein. For example, the conductive material may be carbon black or other form of carbonaceous matter.

When it is desired to check the amount of lubricating fluid 32 in the bearing joint 10, an apparatus 46 for measuring for a preselected level of electrical resistance between the electrical conductor 42 and the body of the track pin 16 is utilized. Specifically, the apparatus is preferably a conventional ohmmeter having a pair of electrical leads 48 and 50 which are respectively placed in contact with the conductor 42 and the track pin 16. A gauge or dial 52 indicates the resistance reading which is related to the level of the lubricating fluid within the chamber 24.

Figure 2:
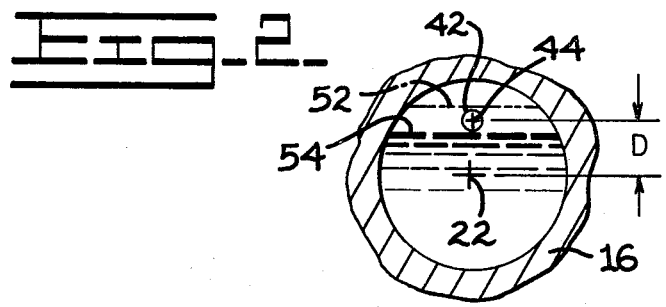
FIG. 2 is a diagrammatic end view of the bearing joint shown in FIG. 1.

In operation, it is a convenient matter to place the first and second leads 48 and 50 of the ohmmeter 46 into electrical contact with the electrical conductor 42 and the track 16, and initially with the axis 44 of the conductor located substantially directly above the central axis 22 of the bearing joint 10 as shown in FIG. 2. If the level of the lubricating fluid is at a first elevation 52 above the conductor 42 as shown in phantom, the resistance reading at the dial 52 would reflect a preselected level of electrical resistance indicating that the joint was substantially full of lubricating fluid. However, if the level of the lubricating fluid is at a second lower elevation 54 below the conductor as shown in solid lines, the resistance reading would be higher than such preselected level and substantially infinite since the conductor would not be in contact with the lubricating fluid and would be electrically isolated.

Figure 3:
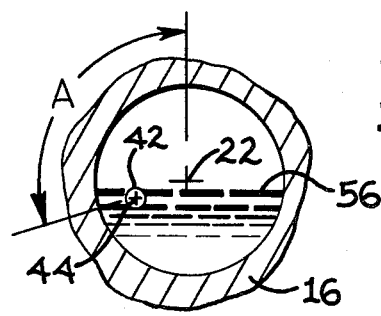
FIG. 3 is a view similar to FIG. 2, only showing the bearing joint rotated relative to a central axis thereof.
Figure 4:
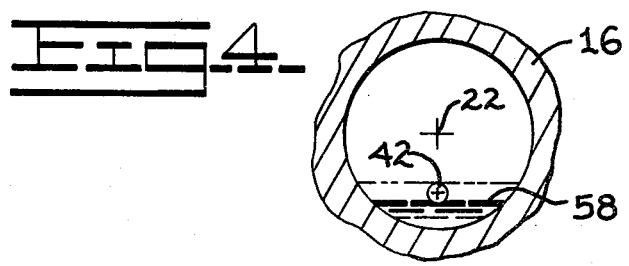
FIG. 4 is a view similar to FIGS. 2 and 3, only shows the bearing joint angularly rotated to another position.

If a resistance reading at the dial 52 indicates that the level of lubricating fluid is below the location of the conductor 42 in the FIG. 2 position, then it is a simple matter to relocate that bearing joint 10 relative to the endless loop of the track chain 12 so that the axis 44 of the electrical conductor 42 is substantially rotated downwardly through the angle "A" or elevationally lowered relative to the central axis 22 to a third elevation 56 as is illustrated in FIG. 3. A resistance reading by the ohmmeter 46 of about the preselected value will again indicate the presence of lubricating fluid above the elevation of the conductor.

Further relative movement of the axis 44 of the electrical conductor 42 to a fourth elevation 58 directly below that of the central axis 22 will enable a resistance measurement to be taken to determine the presence or absence of a preselected minimum amount of lubricating fluid in the bearing joint 10 without opening the joint.

In summary, a method of measuring the fluid level in a bearing joint 10 without opening it has been described, which method includes the steps of:

Step (a) filling an internal chamber in a body of the bearing joint with an electrically conducting fluid through an opening communicating with the chamber;

Step (b) installing an electrically nonconducting plug having an electrical conductor in the body of the bearing joint, the conductor extending through the plug and into the chamber; and Step (c) measuring electrical resistance between the electrical conductor and the body as an indicator of the presence of the fluid in the chamber.

In the event a relatively high initial electrical resistance reading indicates the absence of a preselected amount of the lubricating fluid in the bearing joint, then the offset axis of the electrical conductor can be subsequently positioned at progressively lowered elevational attitudes relative to the central axis of the bearing joint so that the approximate fluid level can be accurately determined upon noting a substantial decrease in the resistance reading. In this way even the leaking rate of each one of the bearing joints of the track chain can be continuously monitored as by taking separate readings at specified periodic intervals of service usage of the track chain.

While the invention has been described and shown with particular reference to a single embodiment, it is apparent that variations are possible that would fall within the scope of the present invention. For example, the plug 34 could be provided with a lubricant filling passage axially therethrough in which is received an auxiliary plug for closing the filling passage, not shown. Such filling passage and auxiliary plug are disclosed and fully described in U.S. Pat. No. 3,831,240, issued to R. L. Boggs, et al. on Aug. 27, 1974. Nevertheless, such modification would not effect the general operational relationship of the conductor 42, the fluid 32 and the ohmmeter 46, but only relate to refilling of the chamber 24 by releasing the auxiliary plug and refilling through the lubricant filling passage rather than necessitating the release of entire plug 34 from the opening 30.

Other aspects, objects and advantages will become apparent from a study of the specification, drawings and appended claims.

The embodiments of the invention in which an exclusive property or privilege is claimed are defined as follows:

1. In a bearing joint of the type having a body defining an internal chamber, an opening for supplying a fluid to the chamber, and an electrically nonconducting plug having a central axis connected in the opening, wherein the improvement comprises:
    an electrical conductor extending through the plug and into communication with the chamber, the conductor having an axis offset from the central axis of the plug.

2. The bearing joint of claim 1 wherein the body, the chamber, the opening and the plug have a common central axis and the axis of the conductor is parallel to the central axis and located a preselected radial distance therefrom.

3. The bearing joint of claim 2 wherein the fluid is oil having an electrically conductive material suspended therein.

4. The bearing joint of claim 1 wherein the plug has inner and outer end surfaces and the electrical conductor extends axially outwardly beyond the inner and outer end surfaces.

5. A method of measuring the fluid level in a bearing joint comprising:
    Step (a) filling an internal chamber in a body of the bearing joint with an electrically conducting fluid through an opening communicating with the chamber;
    Step (b) installing an electrically nonconducting plug having an electrical conductor in the body of the bearing joint, the conductor extending through the plug and into the chamber; and
    Step (c) measuring electrical resistance between the electrical conductor and the body as an indicator of the presence of the fluid in the chamber.

6. The method of claim 5 including Step (d) respositioning the electrical conductor at various elevational positions relative to the axis of the plug simultaneously with Step (c) and determining the fluid level in the joint by noting a substantial decrease in the electrical resistance when the conductor is at or below the fluid level.

* * * * *